United States Patent
Cossairt et al.

(10) Patent No.: US 7,277,226 B2
(45) Date of Patent: Oct. 2, 2007

(54) RADIAL MULTIVIEW THREE-DIMENSIONAL DISPLAYS

(75) Inventors: Oliver S. Cossairt, Cambridge, MA (US); Joshua Napoli, Arlington, MA (US)

(73) Assignee: Actuality Systems, Inc., Burlington, MA (US)

(*) Notice: Subject to any disclaimer, the term of this patent is extended or adjusted under 35 U.S.C. 154(b) by 229 days.

(21) Appl. No.: 11/035,607

(22) Filed: Jan. 14, 2005

(65) Prior Publication Data
US 2005/0180007 A1   Aug. 18, 2005

Related U.S. Application Data

(60) Provisional application No. 60/537,116, filed on Jan. 16, 2004.

(51) Int. Cl.
G03B 21/56 (2006.01)
G03B 21/00 (2006.01)
G02B 27/22 (2006.01)

(52) U.S. Cl. ............... 359/446; 359/471; 359/477; 359/478; 353/7; 353/10

(58) Field of Classification Search ............... 359/446, 359/471, 477–479, 462; 353/7, 10
See application file for complete search history.

(56) References Cited

U.S. PATENT DOCUMENTS

| | | | |
|---|---|---|---|
| 3,178,720 A | | 4/1965 | Collender |
| 5,132,839 A | | 7/1992 | Travis |
| 5,537,251 A | * | 7/1996 | Shimada ............. 359/462 |
| 6,183,088 B1 | * | 2/2001 | LoRe et al. ............. 353/7 |
| 6,554,430 B2 | * | 4/2003 | Dorval et al. ............. 353/7 |
| 7,012,601 B2 | * | 3/2006 | Giovinco et al. ......... 345/419 |
| 7,023,466 B2 | * | 4/2006 | Favalora et al. ......... 348/42 |
| 2001/0045920 A1 | * | 11/2001 | Hall et al. ............. 345/32 |

OTHER PUBLICATIONS

R. Hioki and T. Suzuki, "Reconstruction of Wavefronts in All Directions," Japanese Journal of Applied Physics, vol. 4, pp. 816, 1965.

T.H. Jeong et al., "360 Degree Holography," Journal of the Optical Society of America, vol. 56(9), pp. 1263-1264, Sep. 1966.

D.J. DiBetto, "Holographic Panoramic Stereograms Synthesized from White Light Recordings," Applied Optics, vol. 8(8), pp. 1740-1741, Aug. 1969.

* cited by examiner

*Primary Examiner*—W. B. Perkey
*Assistant Examiner*—Magda Cruz
(74) *Attorney, Agent, or Firm*—Cantor Colburn LLP

(57) ABSTRACT

A 3D display may comprise a rotating optical diffuser screen; and a projector for projecting images through the rotating optical diffuser screen. The rotating optical diffuser screen may be structured to optically create an exit pupil, said exit pupil having a limited horizontal viewing angle for displaying 3D images in specific viewing zones as the rotating optical diffuser screen rotates.

21 Claims, 5 Drawing Sheets

RADIAL MULTIVIEW THREE-DIMENSIONAL DISPLAYS

CROSS-REFERENCE TO RELATED APPLICATIONS

The present application claims priority to U.S. provisional application 60/537,116, filed Jan. 16, 2004, the entire disclosure of which is hereby incorporated by reference.

BACKGROUND

Various three-dimensional display architectures exist. Spatial 3-D displays such as Actuality Systems Inc.'s Perspecta® Display create 3-D imagery that fills a volume of space and that appears to be 3-D to the naked eye. One such spatial 3-D display is described in U.S. Pat. No. 6,554,430, "Volumetric three-dimensional display system." This display is formed in the shape of a transparent dome and contains a rotating screen orientated vertically within the dome as shown in FIG. 1. As the screen spins it displays a previously recorded image for example at every 1 degree of rotation for 360 degrees. Human persistence of vision combines these images to create a 3-D view of the previously recorded image. This display with its vertical dome shape can be placed on top of a tabletop for example. One feature of this type of 3-D display is that the imagery provides motion parallax in every direction; in other words, it is a fill parallax display.

Some 3-D displays provide motion parallax information with only one degree of freedom. A well-known family of 3-D displays with restricted motion parallax are horizontal parallax only (HPO) displays. Known HPO displays provide motion parallax along one axis, normally in the horizontal direction, corresponding to left-right motion; when the user moves vertically, the 3-D image appears to track the user's motion because of the lack of vertical parallax information. Displays of this type are taught in: U.S. Pat. No. 3,178,720, "Three dimensional unaided viewing method and apparatus, "; D. J. DeBitetto, "Holographic Panoramic Stereograms Synthesized from White Light Recordings," in *Applied Optics*, Vol 8(8), pp. 1740-1741 (August 1969); and U.S. Pat. No. 5,132,839, "Three dimensional display device."

Another type of restricted parallax display can be called the theta parallax only (TPO) display, which provides motion parallax for a user moving angularly around the display. A 360-degree hologram is a display hologram of this type, as described in R. Hioki and T. Suzuki, "Reconstruction of Wavefronts in All Directions," in *Japanese Journal of Applied Physics*, Vol. 4, p. 816 (1965); and in T. H. Jeong, P. Rudolf, and A. Luckett, "360° Holography," in *Journal of the Optical Society of America*, Vol. 56(9), pp. 1263-1264 (September 1966). A cylindrical hologram is another display of this type. As taught in the present application, one embodiment described below is a new example of a TPO display and is a circular display located in a top or in the middle of a table for use with multiple users sitting around a conference room table.

Volumetric 3-D displays, such as that described in U.S. Pat. No. 6,554,430, create volume-filling 3-D imagery that can be seen from almost any viewing position. However, as its projection screen is an omnidirectional diffuser, the light from each projected 3-D pixel is scattered in all directions. The consequence of this is that every 3-D scene appears transparent. In contrast, the present invention may include a volumetric 3-D display which projects 3-D pixels that do not necessarily appear transparent because the emission profile for each 3-D pixel is "programmable" along at least one axis of motion parallax.

Additionally, the Perspecta® display as shown in FIG. 1, ordinarily functions as a high-resolution multiplanar volumetric display. Normally, a 3-D dataset is generated by "slicing" the desired 3-D scene into 198 radially disposed slices, with a resolution of 768×768 voxels per slice. A fast spatial light modulator, such as the Texas Instruments (Plano, Tex.) Digital Mirror Device™ system 120, illuminates an isotropic diffusing screen 190 with the sequence of slices while the screen rotates at 600-1000 rpm. The SLMs are stationary, but several relay mirrors 10 rotate with the screen because they are mounted to a "cake pan" 160. The user perceives 3-D imagery because the eye's integration period is slow enough to treat the assembly of voxels as a unified 3-D scene. The Perspecta® display ordinarily uses a 3-DMD projector 120 to illuminate a diffuse screen 190 via several relay mirrors 10.

Although the Perspecta® display creates high-resolution imagery with full parallax, it does not generate imagery with viewer position-dependent effects such as hidden-surface removal for several simultaneous users. The reason for this is that the diffuser screen treats each voxel as an omnidirectional emitter. To explain, in FIG. 1A illustrates the top view of a scene composed of a single cube. An observer looks at 3-D pixel A on Face A. If the cube is desired to appear opaque, then the observer at that location should not see 3-D pixel B on Face B. In contrast, FIG. 1 and FIG. 1B show why volumetric displays with omnidirectional diffuser screens are incapable of rendering opaque features. A screen 190 rotates about axis of rotation 170. At time t1, 3-D pixel B is projected and radiates visibly in all directions. Some of that light will enter the eye of the observer. At a later time t2, the screen has moved and light from 3-D pixel A is projected which also enters the eye of the observer. Therefore, the observer effectively sees a superimposition of 3-D pixels A and B. Clearly a new approach is needed to "program" or control the radiative characteristics of each 3-D pixel in a reconstructed 3-D scene. Additionally, the imagery suffers from a vertical "dead zone" due to limitations of the scattering profile of the diffuser screen. This application offers several solutions to these problems.

SUMMARY OF THE INVENTION

A 3D display may comprise a rotating optical diffuser screen; and a projector for projecting images through the rotating optical diffuser screen. The rotating optical diffuser screen may be structured to optically create an exit pupil, said exit pupil having a limited horizontal viewing angle for displaying 3D images in specific viewing zones as the rotating optical diffuser screen rotates.

A 3D display may also comprise a rotating and vertically orientated Fresnel lens, a rotating and vertically orientated diffuser located proximate to the Fresnel lens, a projector for projecting images, at least one relay mirror for reflecting the projected images through the Fresnel lens and the diffuser, wherein the Fresnel lens is structured to optically create an exit pupil at a desired viewing distance, said exit pupil having a limited horizontal viewing angle for displaying 3D images in specific viewing zones as the diffuser and the Fresnel lens rotate.

A 3D display may also comprise a static optical diffuser; and a rotating projector for projecting images through the optical diffuser wherein the optical diffuser is structured to optically create an exit pupil, said exit pupil having a limited horizontal viewing angle for displaying 3D images in at least one specific viewing zone.

A 3D display may also comprise means for displaying 3D images by creating an exit pupil, said exit pupil having a limited horizontal viewing angle for displaying opaque 3D images in at least one specific viewing zone.

BRIEF DESCRIPTION OF THE FIGURES

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENTS

Figure 2:
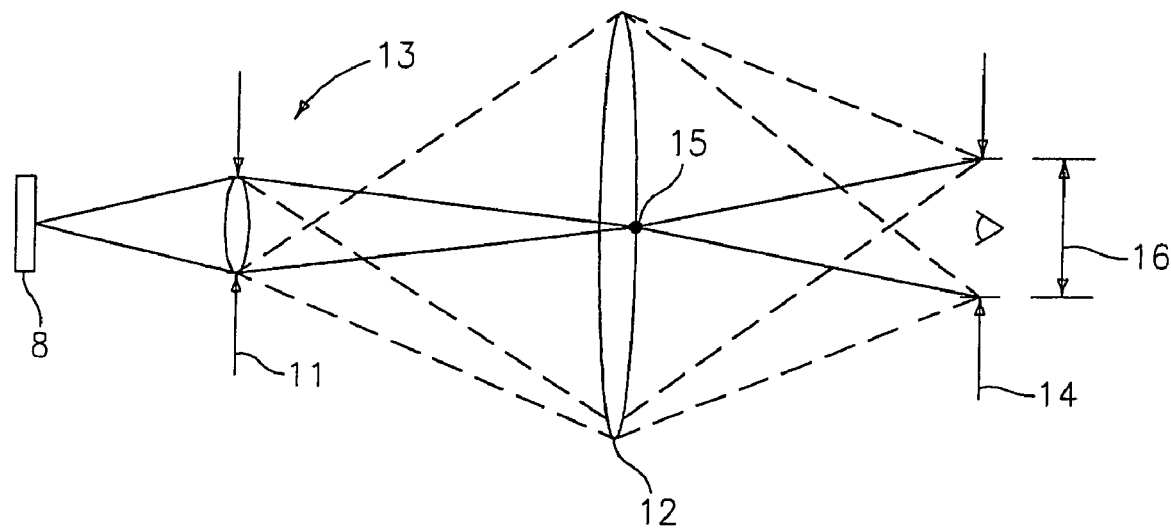
FIG. 2 is a lens diagram.

For discussion purposes and as shown in FIG. 2, it is noted that a smallest aperture in a projection lens 11 limits the field of view of the image. The image of this aperture, created by a field lens 12, defines an exit pupil 14 through which all the rays in the optical system converge. The entrance pupil 13 of the system can be controlled so that different 2D images are viewable from different positions. In prior art view-sequential 3D systems, the exit pupil 14 is manipulated by an electronically switchable shutter. The shutter, such as a transmissive LCD with a scrolling translucent column, is used to further limit the viewing zone 16. Additionally, a sequence of images generated by known algorithms is loaded into a spatial light modulator (SLM). The images correspond to snapshots of the 3D scene as rendered by a camera moving along a horizontal track. The sequence of images is synchronized with the position of the scrolling translucent column, thereby scanning a viewing zone 16 or eyebox. As a result, the user will see the appropriate 2D image for his position relative to the display. FIG. 2 also shows that a point 15 on the DMD projector 8 is imaged by the projection lens 11 onto a field lens 12. Simultaneously, an image of the entrance pupil 11, which is the aperture of the projection lens 11, is imaged into the viewing zone by the field lens 12. This image is the exit pupil 14, and its size determines the angle/region that the image of the DMD projector 8 that is viewable on the field lens. Aspects of this methodology above can be applied in an unusual manner to swept-screen 3D displays as described below.

Figure 1:
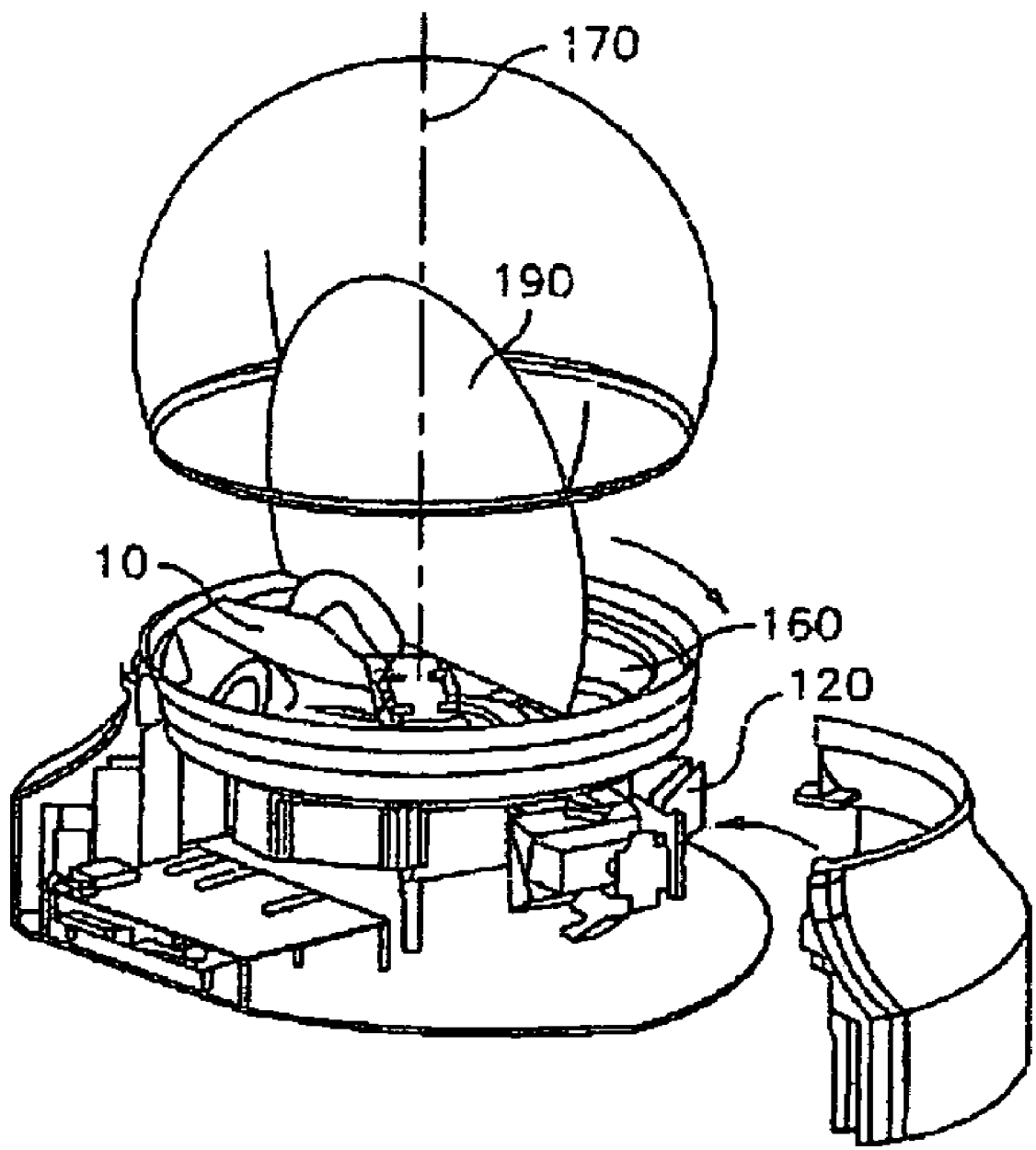
FIG. 1 is a perspective view of a prior art volumetric display.
Figure 4:
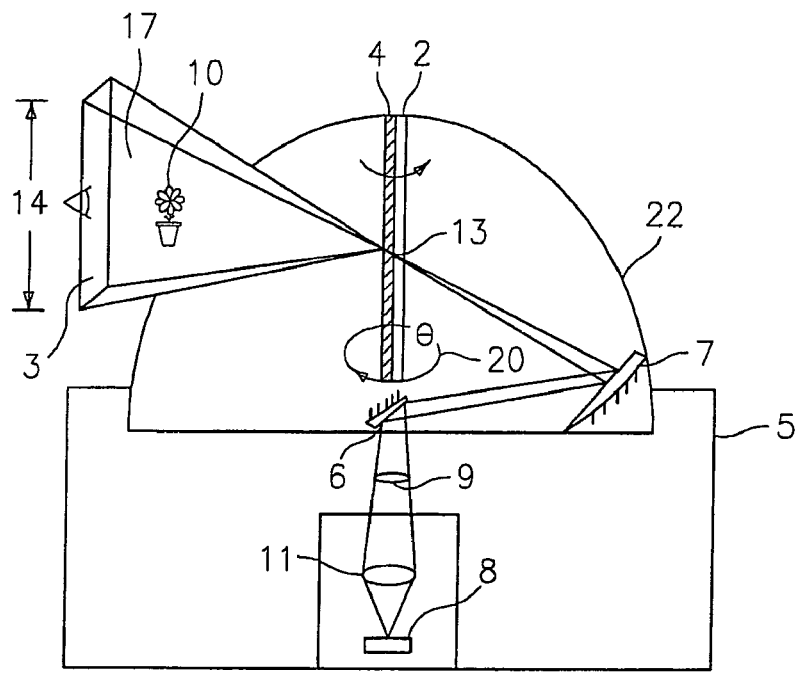
FIG. 4 is a side view of an embodiment having a Fresnel lens.

In contrast to prior art FIG. 1, the first present embodiment shown in FIG. 4 does not use an omnidirectional diffuser projection screen 190 as in the prior art, but instead uses a Fresnel lens 2 and a vertically orientated diffuser 4 which may also be considered a diffuser "screen" but not an omnidirectional diffuser screen. The diffuser 4 may be an anisotropic diffuser which is a diffuser that has properties that differ according to the direction of measurement. For example, in FIG. 4 view zone 3 is shaped in the desired vertical direction like a rectangle rather than a more even Lambertian distribution circle shape due to the anisotropic nature of the diffuser 4. A cakepan 5 spins the Fresnel lens 2 and the diffuser 4 and also contains a first relay mirror 6 and second relay mirror 7 which receives 2D images projected from a DMD (digital micromirror device) projector 8. A motor (not shown) may spin the cakepan 5. In FIG. 4, the cakepan 5 supports the relay mirrors (6,7), diffuser 4, and Fresnel lens 2, which all rotate together as shown by theta θ 20. The DMD projector 8 is located in a stationary mount. A clear dome 22 may be included to protect the device but the dome 22 is not required.

3-D imagery is created by displaying a sequence of two-dimensional (2D) images 9, each of which is viewable from a distinct location or "viewzone" 3. Each image corresponds to what a reconstructed 3-D scene 10 looks like from an angular sector around the display. The reconstructed 3-D scene 10 has been previously recorded by a camera, computer graphics algorithms, or other methods well-known to those skilled in the field of holographic stereography. The present method in is contrast to the usual mode of operation of swept-screen displays, in which each image is recorded as a slice through the 3-D scene, i.e., not a view or rendered snapshot of the 3D scene as in this embodiment. Thus, a 3-D volume 17 is filled not with 2-D slices of the desired 3-D scene, but with 2-D image 9 which is a view of the scene as rendered by an inward-facing recoding camera located on a circular track around the scene (not shown). Thus, the present invention may include a volumetric 3-D display which projects 3-D pixels that do not necessarily appear transparent because the emission profile for each 3-D pixel is "programmable" along at least one axis of motion parallax as mentioned in the previous discussion of FIG. 1A.

Such a system provides several advantages over the current volume filling technique discussed in the Background. The Fresnel lens 2 is used to create an exit pupil 14 at the desired viewing distance so as to limit the horizontal viewing angle of each DMD image. The exit pupil 14 is always directly in front of the Fresnel lens 2 so that when the diffuser 4 rotates, the exit pupil 14 location changes to fill a different region of the full 360 degree viewing zone (see FIG. 3). Whereas shutter-based systems limit the exit pupil by breaking the full viewing zone into smaller viewing zones, this embodiment mechanically scans the exit pupil 14 to create the full viewing zone. A new DMD 2D image 9 is chosen for each screen/viewzone orientation so that each viewing zone makes visible the appropriate perspective view of the recorded 3D scene 10 for that location in order to result in a seemingly opaque image such as the one shown in FIG. 1A.

Figure 3:
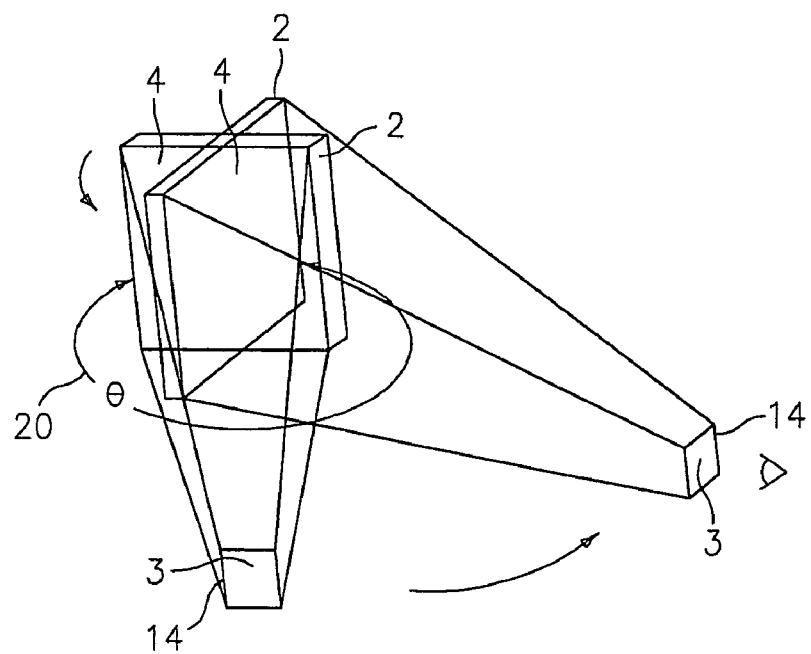
FIG. 3 is a diagram of a rotating screen and an exit pupil.

The motion of the display is shown in FIG. 3. As the Fresnel lens 2 and the diffuser 4 rotate, the exit pupil 14 is scanned around the perimeter of the display. The vertical diffuser 4, which may be an anisotropic diffuser affixed to the Fresnel lens 2, enlarges the viewzone 3 in the vertical direction and limits or defines the view zone in the horizontal direction, in this case to form the shape of a rectangle. An ellipse shape or other shape is also possible and contemplated herein as within the scope of this invention depending upon the desired shape and the specific diffuser used. Thus, a different image is displayed on the DMD projector 8 for each exit pupil 14 position. Because each pupil is updated fast enough, the images and the display appear static. A different 2D image is perceived from each pupil position that corresponds to the correct perspective projection of a previously recorded 3D scene 10 or 3D object which appears to the user to be located somewhere within or in front of the display. Thus, the present invention may include a volumetric 3-D display which projects 3-D pixels that do not necessarily appear transparent to a user because the emission profile for each 3-D pixel is a specific unidirectional viewing zone or "programmable" along at least one axis of motion parallax. Again, please see FIG. 1A and FIG. 4.

Figure 6:
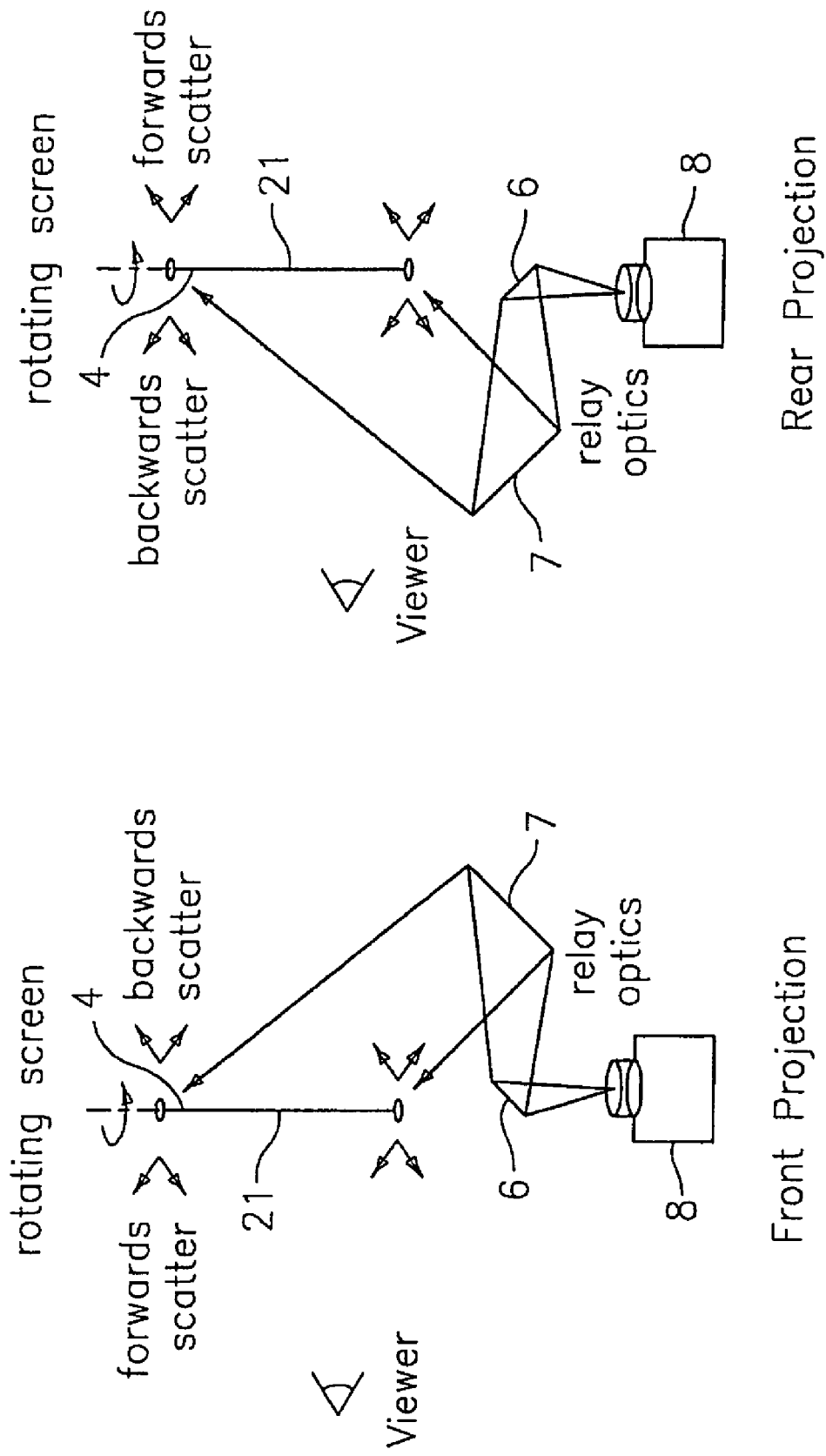
FIG. 6 is a side view of an embodiment having a 50/50 reflective/transmissive diffuser.

One complication with this system is that the inertia of the system may limit the practical rotation speed to 900 rpm. This is acceptable for prior art volume filling imagery because each slice is actually updated twice per rotation (30 Hz) if the prior art screen is used, but for the present method, this means that the display in FIG. 4 would only have a 15 Hz refresh rate at this speed. Obviously, the ideal solution is to rotate the system's exit optics at 1800 rpm. If that is not feasible, one solution is to sandwich a 50/50 mirror and a vertical diffuser between two Fresnel lenses and substitute them in place of the Fresnel lens 2 and the diffuser 4. This is shown in the embodiment of FIG. 6 wherein a 50% reflective and 50% transmissive diffuser screen 21 is implemented. This system would have the same optical properties as FIG. 4, but would allow each view to be updated twice per revolution at the sacrifice of limiting display to 180 degree viewing zone and 50% light loss.

Figure 5:
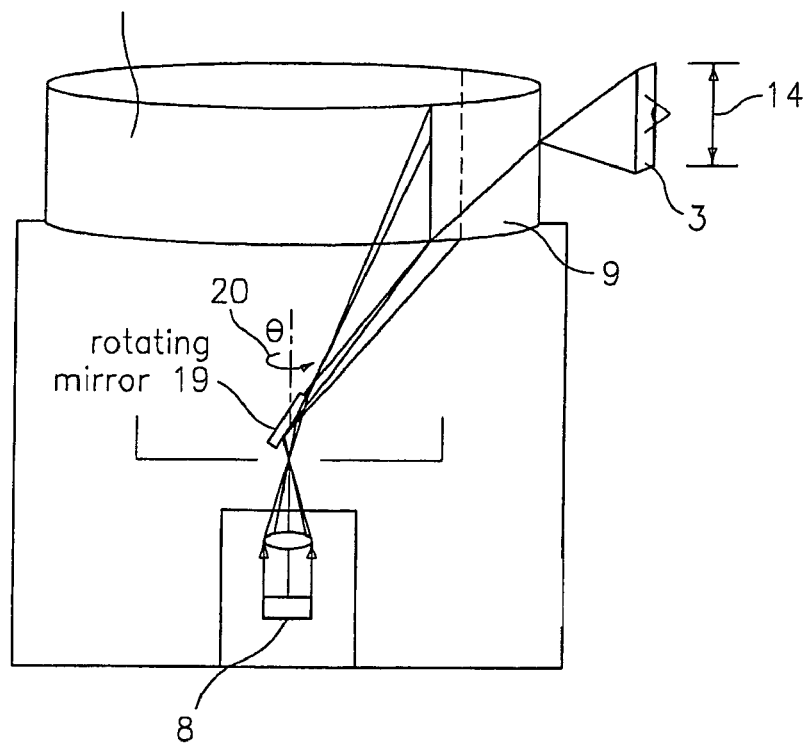
FIG. 5 is a side view of an embodiment having a cylindrically shaped diffuser.

FIG. 5 shows another embodiment system that simplifies the mechanical operation of the display significantly. This second embodiment system removes the rotating display screen or elements entirely and includes a static non-moving cylindrically shaped vertical diffuser 18 that encloses the display in the shape of a curved surface of a cylinder. For this display, an image projected from the DMD projector 8 is focused onto a curved surface, i.e., the cylindrically shaped vertical diffuser 18. It is also possible to eliminate a cakepan 5 entirely for this display and to use only a single deflecting rotating mirror 19 as shown. Such a system as shown FIG. 5, decouples the projection optics entirely from the display, making larger format systems much more feasible. An overhead projection system could be imagined, for example, where a projector and rotating relay mirror are fixed to the ceiling and project onto a cylindrical screen that is mounted to a round conference table for example. In this case, the image size could be limited by the size of the rotating mirror. One way to increase the image size is to enlarge the rotating mirror, thereby increasing the size of the exit pupil. Thus, in FIG. 5 the system uses a similar projection system to the embodiment shown in FIG. 4 except that the Fresnel lens 2 is removed and the vertical diffuser is now stationary and surrounds the display, i.e., cylindrically shaped vertical diffuser 18. The 2D image 9 is focused onto the curved surface of the cylindrically shaped vertical diffuser 18. It also possible for the vertical diffuser to not be made of a cylindrical shape. Other shapes are contemplated. For example, a flat screen could be used. Several flat screens could also be linked together in the shape of a box or a single flat screen could be used wherein an image would be formed only where the flat screen exists. Therefore, projected light that was not incident upon the screen would be lost.

Of course, for each of the above systems, the DMD projector 8 should be controlled with appropriate image data so that the viewer(s) see imagery that corresponds to their location with respect to the display.

The embodiments disclosed above belong to the class of horizontal-parallax-only displays, which includes (for example) holographic stereograms, cylindrical-format holograms, and lenticular 3-D displays. More specifically, the present embodiments may be theta-parallax-only (TPO) displays which allow the image to be displayed at a given angle theta θ 20, so that for example an individual user sitting around a table can view an image specific to an angle theta θ 20 rather than projecting an omnidirectional viewable image of the 3D image to all of the users. Existing algorithms may be used to compute the required image data. This process is well-known to those skilled in the art. In short, a computer will record and render the desired 3-D scene from a plurality of viewpoints, from the point of view of a computer-graphic "camera" that travels circumferentially around the display.

Figure 1A:
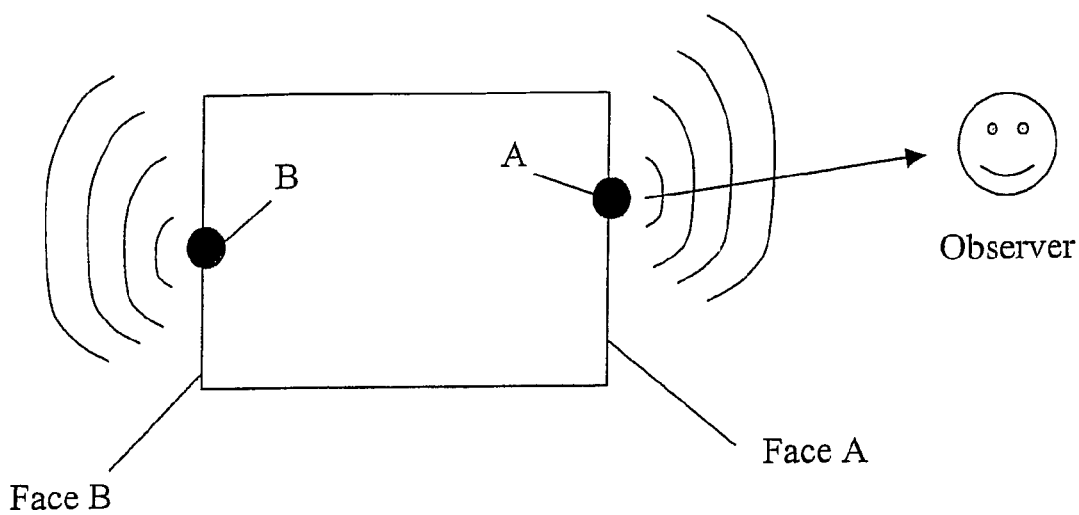
FIG. 1A is a top view of an opaque 3D display.
Figure 1B:
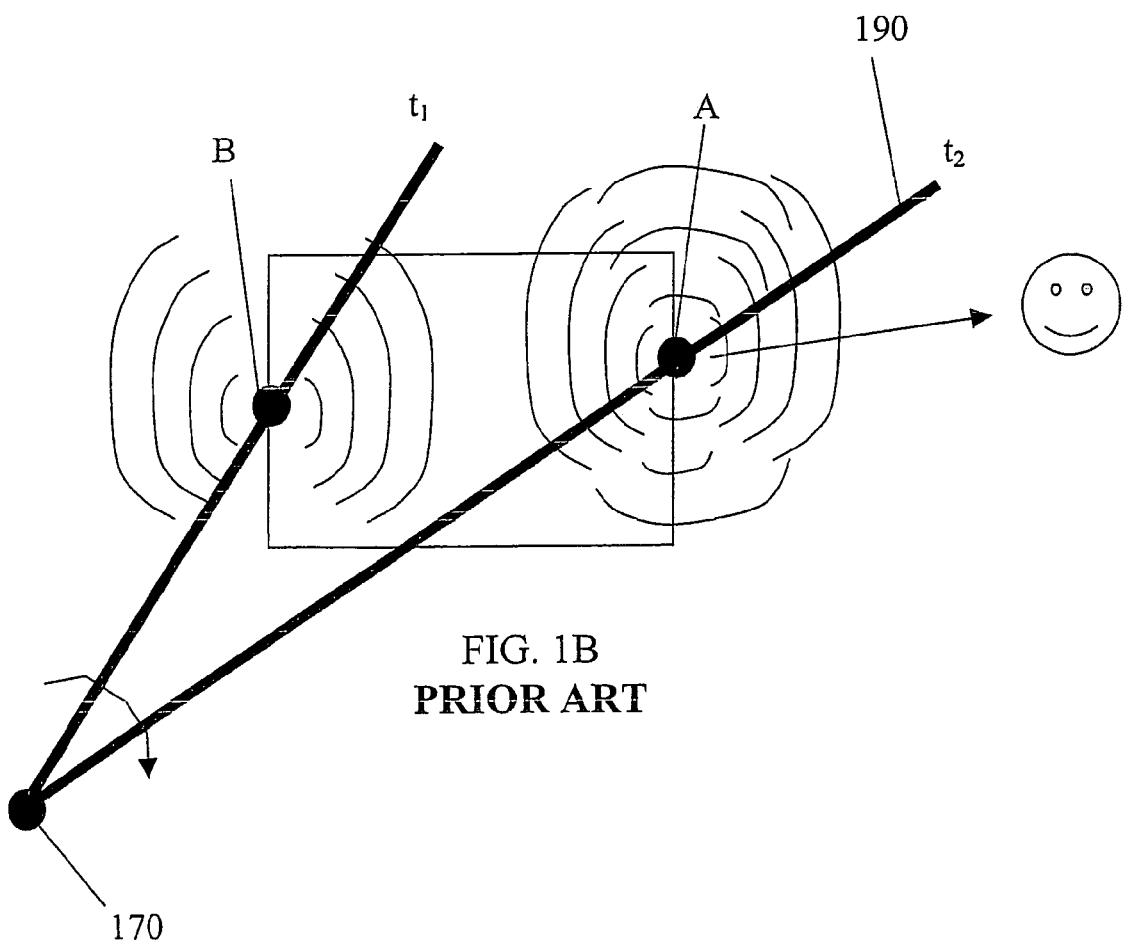
FIG. 1B is a top view of the prior art display screen shown in FIG. 1.

The proposed multi-view 3D display systems provide several advantages in image quality and display format which are useful. For example, the proposed systems would eliminate certain imaging artifacts that may be present in the current displays in addition to adding new visual features such as programmable occlusion, as illustrated in FIG. 1A. Also, in prior art systems, the edge of the rotating screen may occlude the center of the image from all viewing positions, and imprecision in rendering causes imperfections around the axis of rotation. The present embodiments eliminate this behavior.

Thus, a new format for autostereoscopic displays which generate multiview imagery by radial scanning is presented. The format will provide fully interactive 3D imagery. Also, a time-multiplexing principle, which is implemented by the Perspecta display discussed in the Background above, is conveniently translatable to this new format. The format that is proposed will greatly improve the image quality of the 3D images that are displayed and potentially simplify the system design as well.

Benefits of this system include exceptionally high resolution, refresh rate, computational simplicity, large viewing angle, large image size, and cost-effective construction.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A 3D display comprising:
   a rotating optical diffuser screen; and
   a projector for projecting images through the rotating optical diffuser screen;
   wherein the rotating optical diffuser screen is structured to optically create an exit pupil, said exit pupil having a limited horizontal viewing angle for displaying 3D images in specific viewing zones as the rotating optical diffuser screen rotates.

2. The 3D display of claim 1 wherein the rotating optical diffuser screen is structured to optically create the exit pupil at a desired viewing distance.

3. The 3D display of claim 1 wherein the viewing zone is a unidirectional viewing zone only visible from one direction.

4. The 3D display of claim 1 wherein the rotating optical diffuser screen comprises an anisotropic diffuser.

5. The 3D display of claim 1 wherein the rotating optical diffuser screen comprises a fresnel lens and a diffuser element.

6. The 3D display of claim 1 wherein the 3D images are parallax volumetric images.

7. The 3D display of claim 1 wherein the 3D images are opaque in appearance.

8. The 3D display of claim 1 wherein the diffuser screen creates the 3D images to have greater vertical viewing angles in comparison to the limited horizontal viewing angles.

9. A 3D display comprising:
a rotating and vertically orientated Fresnel lens;
a rotating and vertically orientated diffuser located proximate to the Fresnel lens;
a projector for projecting images; and
at least one relay mirror for reflecting the projected images through the Fresnel lens and the diffuser;
wherein the Fresnel lens is structured to optically create an exit pupil at a desired viewing distance, said exit pupil having a limited horizontal viewing angle for displaying 3D images in specific viewing zones as the diffuser and the Fresnel lens rotate.

10. The 3D display of claim 9 wherein the Fresnel lens is structured to optically create an exit pupil at a desired viewing distance, said exit pupil having a limited horizontal viewing angle for displaying 3D parallax volumetric images in specific unidirectional viewing zones as the diffuser and the Fresnel lens rotate.

11. The 3D display of claim 9 wherein the viewing zones are unidirectional viewing zones only visible from one direction.

12. The 3D display of claim 9 wherein the vertically orientated diffuser comprises an anisotropic diffuser.

13. The 3D display of claim 9 wherein the 3D images are parallax volumetric images.

14. The 3D display of claim 9 wherein the 3D images are opaque in appearance.

15. A 3D display comprising:
a static optical diffuser;
a projection means for projecting images through the optical diffuser;
wherein the optical diffuser is structured to optically create an exit pupil, said exit pupil having a limited horizontal viewing angle for displaying 3D images in at least one specific viewing zone.

16. The 3D display of claim 15 wherein the optical diffuser is cylindrically shaped.

17. The 3D display of claim 15 wherein the optical diffuser is flat shaped.

18. The 3D display of claim 15 wherein the viewing zone is a unidirectional viewing zone only visible from one direction.

19. The 3D display of claim 15 wherein the optical diffuser is an anisotropic diffuser.

20. The 3D display of claim 15 wherein the projection means is a rotating optical element.

21. A 3D display comprising:
means for displaying 3D images by creating an exit pupil, said exit pupil having a limited horizontal viewing angle for displaying opaque 3D images in at least one specific viewing zone.

* * * * *